428-408 SR

12/9/86 XR 4,627,998

United States Patent [19]

Akihama et al.

[11] Patent Number: 4,627,998

[45] Date of Patent: Dec. 9, 1986

[54] CARBON FIBER REINFORCED CONCRETE

[75] Inventors: Shigeyuki Akihama, Kanagawa; Tatsuo Suenaga, Tokyo; Makoto Saito, Kanagawa; Hideki Ikeda; Masanori Aya, both of Tokyo; Seiichi Koyama, Ibaraki; Masashi Kamakura, Hyogo; Naoto Mikami, Hyogo; Hideaki Miyuki, Hyogo, all of Japan

[73] Assignee: Kajima Corporation, Tokyo, Japan

[21] Appl. No.: 795,697

[22] PCT Filed: Mar. 1, 1985

[86] PCT No.: PCT/JP85/00103

§ 371 Date: Oct. 16, 1985

§ 102(e) Date: Oct. 16, 1985

[87] PCT Pub. No.: WO85/03930

PCT Pub. Date: Sep. 12, 1985

[30] Foreign Application Priority Data

Mar. 2, 1984 [JP] Japan .................................. 59-38866

Mar. 2, 1984 [JP] Japan .................................. 59-38867

[51] Int. Cl.[4] .............................................. B32B 15/00

[52] U.S. Cl. .................................. 428/285; 264/105; 264/135; 264/234; 264/333; 264/82; 428/284; 428/256; 428/408; 428/418; 428/457; 428/703

[58] Field of Search ................. 264/135, 333, 105, 82, 264/234; 428/408, 703, 256, 418, 457, 287, 285

[56] References Cited

U.S. PATENT DOCUMENTS

| | | | |
|---|---|---|---|
| 3,922,413 | 11/1975 | Reineman | 428/703 |
| 4,314,003 | 2/1982 | Curnow et al. | 428/703 |
| 4,349,398 | 9/1982 | Hearns et al. | 428/703 |
| 4,392,335 | 7/1983 | Heiman | 428/703 |
| 4,419,853 | 12/1983 | Failmezger et al. | 428/703 |

*Primary Examiner*—James J. Bell

*Attorney, Agent, or Firm*—Wenderoth, Lind & Ponack

[57] ABSTRACT

A process for manufacturing a precast composite structure of a matrix of cured carbon fiber reinforced concrete and at least one ferrous metallic member at least partly buried in said matrix, by forming an insulating layer of an electric resistance of at least about 100 ohms at least on that surface of the ferrous metallic member, which will otherwise be brought in contact with a concrete mix, placing the metallic member in position in a mold, pouring into the mold a concrete mix containing 0.2 to 10% by volume of carbon fiber so that said metallic member may be at least partly buried in said concrete mix, partly curing the structure until it becomes self-supporting, de-molding the partly cured structure, and fully curing the structure in an autoclave at a temperature between 100° C. and 215° C.

7 Claims, 6 Drawing Figures

CARBON FIBER REINFORCED CONCRETE

TECHNICAL FIELD OF THE INVENTION

The present invention relates to an improvement of a carbon fiber reinforced concrete. More particularly, it relates to an improvement in curing of a carbon fiber reinforced concrete in which the concrete is cured while being in contact with a surface of ferrous metal. In one aspect the invention provides a precast composite structure comprising a matrix of cured carbon fiber reinforced concrete and at least one ferrous metallic member at least partly buried in the matrix. In another aspect the invention provides a process for manufacturing such a precast composite structure.

BACKGROUND OF THE INVENTION

The inherent brittleness of a cement matrix can be substantially overcome by dispersing therein a suitable amount of a suitable fibrous material, such as carbon fiber. Since the development of inexpensive pitch-based carbon fibers, extensive studies on a practical use of carbon fiber reinforced concrete have been made, and great expectations are entertained of this new construction material having strngth, distortion and elastic properties which have not been realized by the heretofore available cement concretes.

We have been engaged for a long year in a research and development work on the carbon fiber reinforced concrete. During our work we have encountered a problem which is not the case with ordinary concrete. The problem is a phenomenon that if metal is in contact with carbon fiber reinforced concrete, corrosion (oxidation) of the metal extensively proceeds during the curing of the concrete. More specifically, when carbon fiber reinforced concrete is cured while being in contact with ferrous metallic members, such as reinforcing steel bars and meshes, steel molds, bond wires, anchor fasteners, spacers and the like, corrosion of the metal rapidly proceeds during the curing of the concrete on those areas of the ferrous metallic members where they are in contact with the concrete to an extent unexpected with ordinary concrete.

DESCRIPTION OF THE INVENTION

An object of the invention is to solve the above-mentioned problem. We have ascertained that when carbon fiber, which is very conductive and has a noble potential well comparative to that of a noble metal, is in contact with a basic metal (ferrous metal), there is formed a local cell, which is a primary cause of the metal corrosion, and found that upon curing of concete containing from 0.2 to 10% by volume of carbon fiber dispersed therein while being in contact with a surface of ferrous metal, the problem of the metal corrosion peculiar to the carbon fiber reinforced concrete can be substantially completely ovecome, if an insulating layer having an electric resistance of at least 100 ohms is preformed on the surface of the ferrous metal in advance of the curing.

Thus, the invention provides a process for manufacturing a precast composite structure of carbon fiber reinforced concrete comprising a matrix of cured carbon fiber reinforced concrete and at least one ferrous metallic member at least partly buried in said matrix, said process comprising the steps of:

forming an insulating layer having an electric resistance of at least about 100 ohms at least on that surface of said ferrous metallic member, which will otherwise be brought in contact with a concrete mix, placing said ferrous metallic member having the insulating layer formed thereon in position in a mold, pouring into said mold a concrete mix comprising a hydraulic cement, water, aggregate and 0.2 to 10% by volume of carbon fiber so that said ferrous metallic member may be at least partly buried in said concrete mix, partly curing the so molded composite structure in said mold until it becomes self-supporting, demolding the partly cured composite structure from said mold, and fully curing the demolded composite structure in an autoclave at a temperature between 100° C. and 215° C.

The invention further provides a precast composite structure of carbon fiber reinforced concrete comprising a matrix of cured carbon fiber reinforced concrete containing 0.2 to 10% by volume of carbon fiber, at least one ferrous metallic member at least partly buried in said matrix and an insulating layer on the surface of said ferrous metallic member for preventing contact of said ferrous metallic member with the carbon fiber, said insulating layer having an electric resistance of at least about 100 ohms.

The composite structures in accordance with the invention have excellent strengh, distortion and elastic propeties peculiar to carbon fiber reinforced concrete, and exhibit minimum change of dimensions. They are very useful as construction materials for exterior and interior walls and floors, particularly in constructing a floor of a room in which a computer or office automation instruments are to be installed or a floor of a clean room or operation room.

According to the invention, the formation of a local cell, owing to contact of the carbon fiber with the metallic member, or a flow of an electric current generated by such a local cell is prevented by forming an insulating layer on that surface of the metallic member which will otherwise be brought in contact with a concrete mix having carbon fiber dispersed therein. For this purpose we have found that in the case of a concrete mix having from 0.2 to 10% by volume of carbon fiber dispersed therein the insulating layer should have an electric resistance of at least about 100 ohms, preferably at least about 500 ohms.

Any organic or inorganic material capable of forming an insulating layer having an electric resistance of at leasr about 100 ohms, preferably at least about 500 ohms, on the ferrous metallic member may be used in the practice of the invention. Suitable organic materials for forming the insulating layer include, for example, epoxy resins, acrylonitrile-butadiene rubbers, acrylonitrile-styrene-butadiede rubbers, silicone resins and dispersions of "Tefron" (e.g., polytetrafluoroethylene). Suitable inorganic materials include, for example, cement mortar or paste and dispersions of ceramics (e.g., alcoholic dispersions of $SiO_2$, $ZrO_2SiO_2$ or $SiC+ZrO_2\text{-}SiO_2$). For easiness in processing and from an economical viewpoint we prefer to use an epoxy resin or a cement mortar or paste.

Commercially available normally particulate epoxy resins, which comprise a Bisphenol A type epoxide and a suitable curing agent (a phenol or aromatic amine) and which have a gel time of from 5 to 25 seconds at 200° C., may be conveniently used in forming the insulating layer. In practice, at least those areas of the ferrous metallic member where the insulating layer is to be formed are cleaned by shot blasting. The metallic member is preheated and the particulate epoxy resin is applied thereto by an electrostatic coating technique. If necessary, the resin may be baked for complete cure. When an assembly of plural ferrous metallic members is to be used, the insulating layer may be formed on the overall surfaces of the assembly by shot blasting the individual ferrous metallic members, assembling the members in position, preheating the assembly so obtained, exposing the preheated assembly to a fluidized bed of a particulate epoxy resin so that the resin may adhere to the overall surfaces of the assembly, where it may melt and cure, and baking the assembly in a baking furnace.

The layer of the cured epoxy resin so formed should preferably be continuous, and must have an electric resistance of at least about 100 ohms, preferably at least about 500 ohms. This preferred value of the electric resistance of at least about 500 ohms can be safely realized, if the cured epoxy resin layer has a thickness of about 100 μm or more. The upper limit of the thickness of the epoxy resin layer is not very critical. The thickness in excess of about 500 μm is not necessary in many cases.

Suitable cement mortars and pastes which may be used for forming the insulating layer on the ferrous metallic member in accordance with the invention may comprise a hydraulic cement, water, fine aggregate such as siliceous sand and polymer, with a water to cement ratio of from 20 to 40, a fine aggregare to cement ratio of from 0 to 2 and a polymer to cement ratio of from 0 to 30. In the case of a cement paste mix containing no fine aggregate, we prefer to add a polymer to the mix at a polymer to cement ratio of at least 2. When no polymer is used, we prefer to form the insulating layer using a cement mortar containing fine aggregate at a fine aggregate to cement ratio of at least 0.5. The polymer may be added to the cement mix in the form of a latex or emulsion. Examples of the suitable latex or emulsions include, for example, natural rubber latices, acrylonitrile-butadiene rubber latices, vinyl chloride-vinylidene chloride copolymer emulsions, acrylate polymer emulsions and polyvinyl acetate emulsions. In practice, the areas of the ferrous metallic member, where the insulating layer is to be formed, are cleaned by shot blasting, and coated with the cement mortar or paste mix as described above. The mix is then at least partly cured. The preferred value of the electric resistance of at least about 500 ohms can be safely realized, if the cured cement mortar or paste layer has a thickness of about 1 mm or more. The upper limit of the thickness of the cement mortar or paste layer is not very critical. The thickness in excess of about 5 mm is not necessary in many cases.

In a case of a ferrous metallic member, which is to be entirely buried in the matrix of cured carbon fiber reinforced concrete of the precast composite structure, such as a reinforcing steel bar or mesh, or a steel bond wire, the insulating layer is formed on the entire surfaces of the member. Whereas, in a case of a ferrous metallic member, which is to be partly buried in in the matrix of cured carbon fiber reinforced concrete of the precast composite structure, such as an insert or anchor fastener, the insulating layer is formed at least on those surfaces of the member which will otherwise be brought in contact with the concrete mix. The ferrous metallic members so treated with the insulating material are placed in position in a mold suitable for molding the desired structure. In addition to the mold, suitable spacers may be used, depending upon the particular shape of the desired structure. The mold, and spacers if any, should have been pretreated with a suiteble releasing agent, such as mineral oil.

When the ferrous metallic members, which are to be at least partly buried in the final product, have been suitably assembled in the mold treated with a releasing agent, together any spacers, if used, which have also been treated with a releasing agent, the concrete mix containing carbon fiber is poured into the mold.

The concrete mix comprises a hydraulic cement, water, aggregate and 0.2 to 10% by volume of carbon fiber. The length of the carbon fiber may vary within the range from about 1 mm to about 50 mm. We have found that within this range the length of the carbon fiber does not substantially affect the the corroding property of the fiber. The corrosion is promoted as the content of the carbon fiber increases. We have confirmed, however, that even with the highest possible carbon fiber content (i.e., 10% by volume) the corrosion problem can be overcome by the insulating layer having an electric resistance of at least about 100 ohms, preferably at least about 500 ohms, formed on the metallic member. Accordingly, in the practice of the invention, the particular content of the carbon fiber in the concrete mix as well as the particular length of the carbon fiber used may be selected within the prescribed ranges, solely depending upon the intended mechanical properties of the cured carbon fiber reinforced concrete structure.

Other conditions of the not yet cured concrete mix, including the nature of the hydraulic cement, use or non-use of a polymer, the water to cement ratio, the aggregate to cement ratio and the polymer to cement ratio, do not constitute the crux of the invention. Regarding these conditions, those normally employed in the not yet cured carbon fiber reinforced concrete mix may be used in the practice of the invention. Generally, the not yet cured concrete mix containing the prescribed amount of carbon fiber may have a water to cement ratio of from 20 to 70, an aggregate to cement ratio of from 0.5 to 10 and a polymer to cement ratio of from 0 to 20. As the aggregate, we prefer fine aggregate, such as siliceous sand. But a part of the fine aggregate may be replaved by crude aggregate, if desired. When a polymer is to be incorporated, the latices and emulsions, as hereinabove described with respect to the insulating cement mix, may be used. If desired, other additives normally employed in concrete mixes, such as thickeners and dewatering agents, may be added to the concrete mix used in the practice of the invention.

The composite structure so molded is partly cured in the mold until it becomes self-supporting. This is usually effeted by allowing the composite structure in the mold to stand under ambient conditions. If desired, it may be effected in an atmosphere of warm steam.

The partly cured self-supporting composite structure is demolded from the mold, placed in an autoclave and fully cured in an atmosphere of saturated steam at a temperature of from 100° C. and 215° C., preferably at a temperature of from 150° C. to 200° C. Such an autoclave curing in an atmosphere of saturated stesm at an elevated temperature (100° to 215° C.) and under a superatmospheric pressure (0 to 20 atmosphere gauge)

corresponding to the temperature, is necessary in order to obtain a precast structure having a good dimensional stability. Incidentally, it is not always necessary to remove all the elements of the mold and all the spacers, when used, from the demolded partly cured composite structure, in advance of the autoclave curing of the latter. The demolded structure may be subjected to the autoclave curing without having a part of the mold elements and all or part of the spacers, if any, removed, and thereafter such mold elements and spacers may be remeoved from the fully cured product.

The invention will be further described with reference to the attached drawings, in which.

Figure 3:
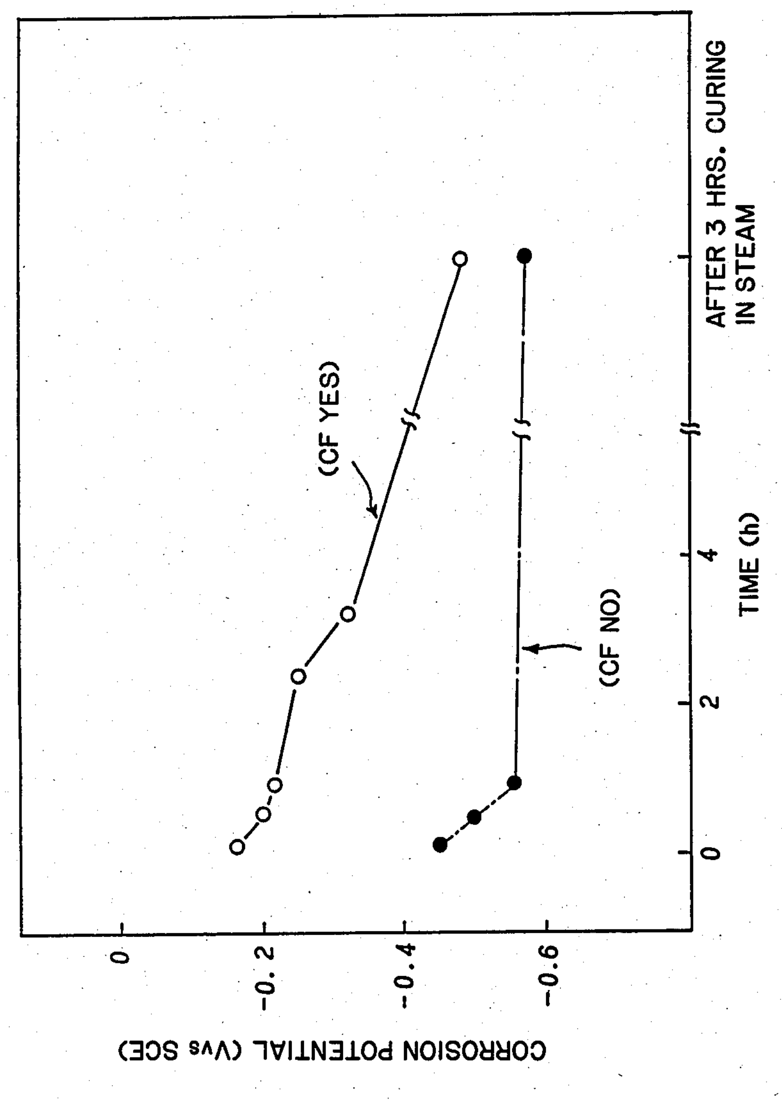
Figure 4:
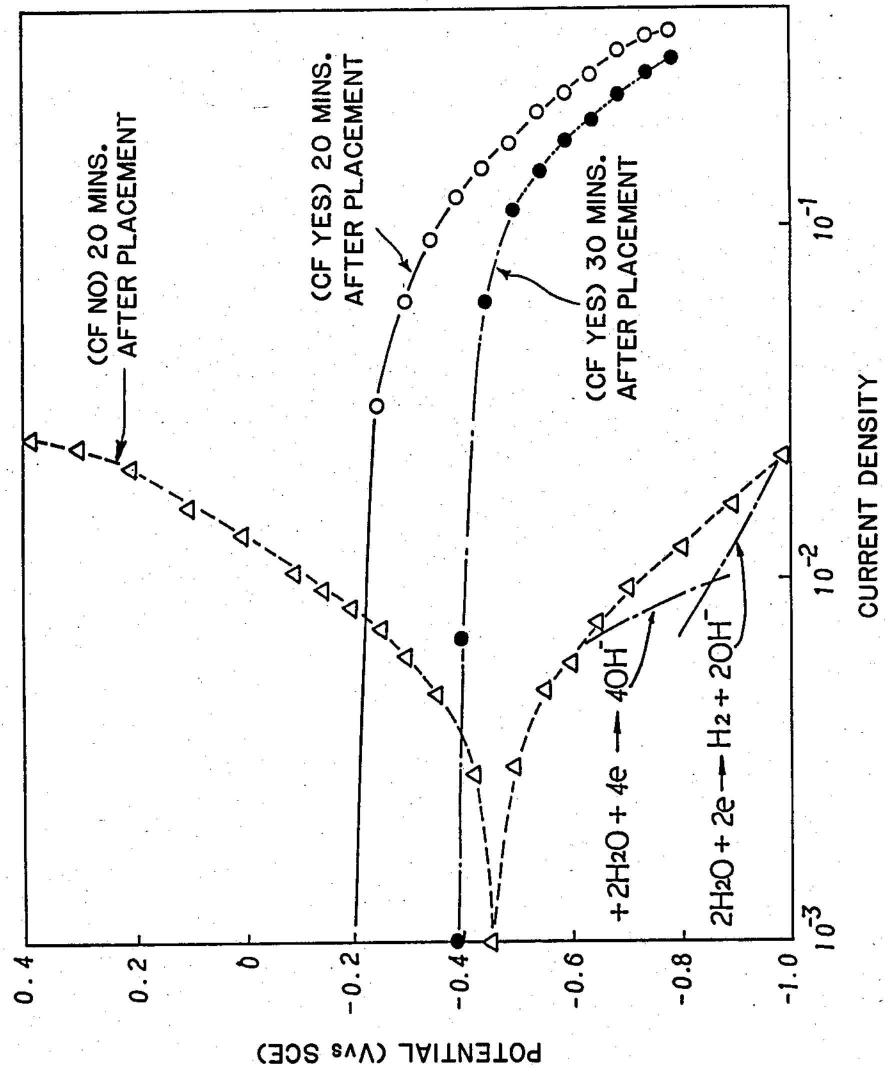
Figure 5:
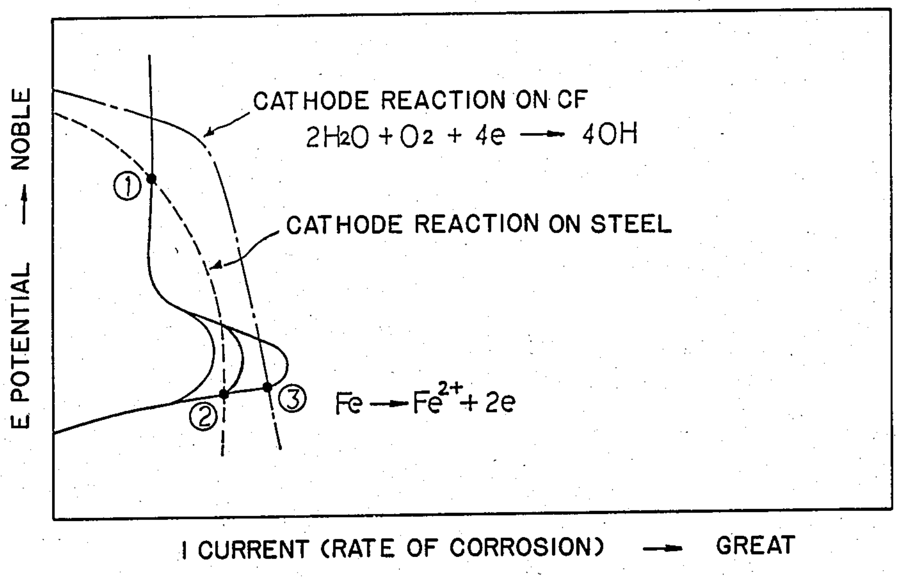
Figure 6A:
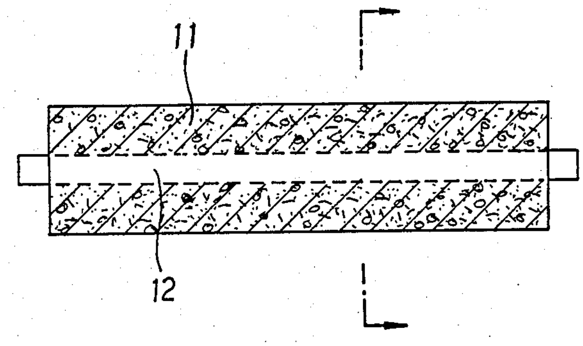
Figure 6B:
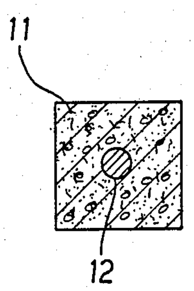

FIG. 3 graphically shows a change with time of the corrosion potential of a steel maintained in a cement mortar containing carbon fiber, and that of the same steel mainrained in the corresponding cement mortar containing no carbon fiber;

FIG. 4 graphically shows a behavior of the cathode polarization of a steel in a cement mortar containing carbon fiber, and that of the same steel maintained in the corresponding cement mortar containing no carbon fiber;

FIG. 5 is a conceptioal view for electrochemically explaining the steel corrosion in a carbon fiber reinforced concrete; and FIG. 6 shows the shape and dimensions of a test piece subjected to an accelerated corrosion test.

Figure 1:
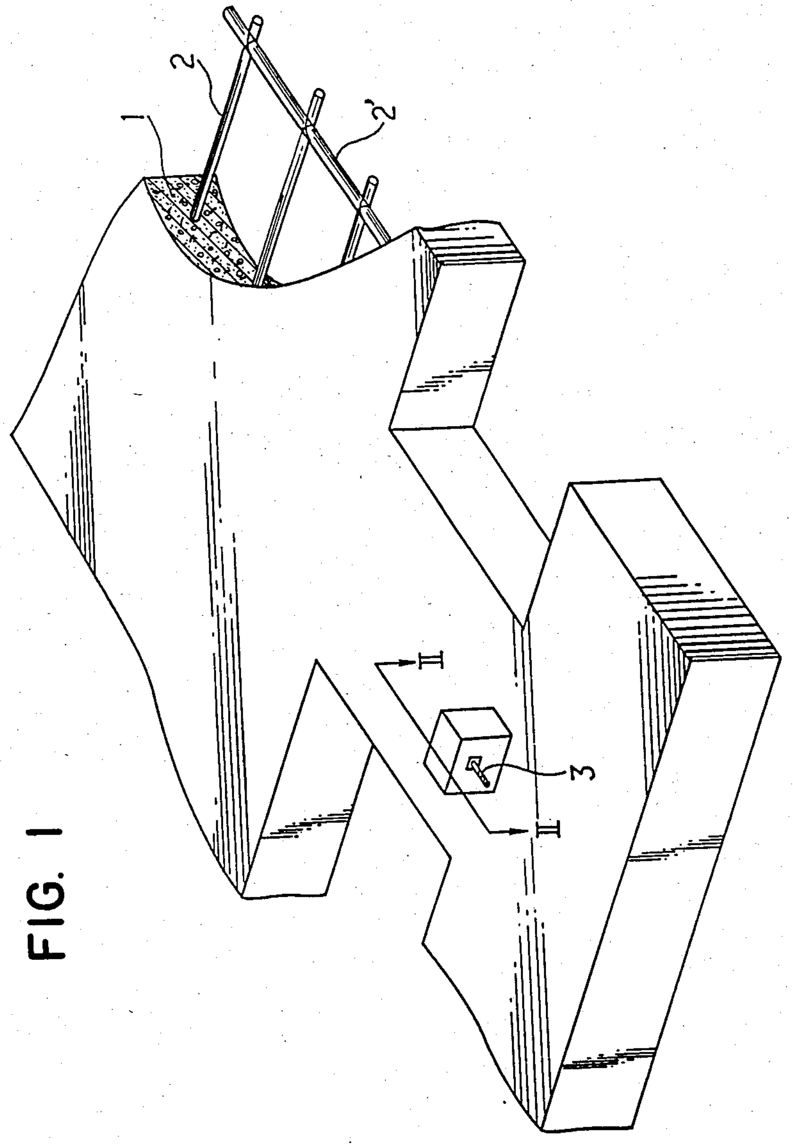
FIG. 1 is a perspective view of an example (an exterior wall material) of a precast composite structure of carbon fiber reinforced concrete in accordance with the inventon.
Figure 2:
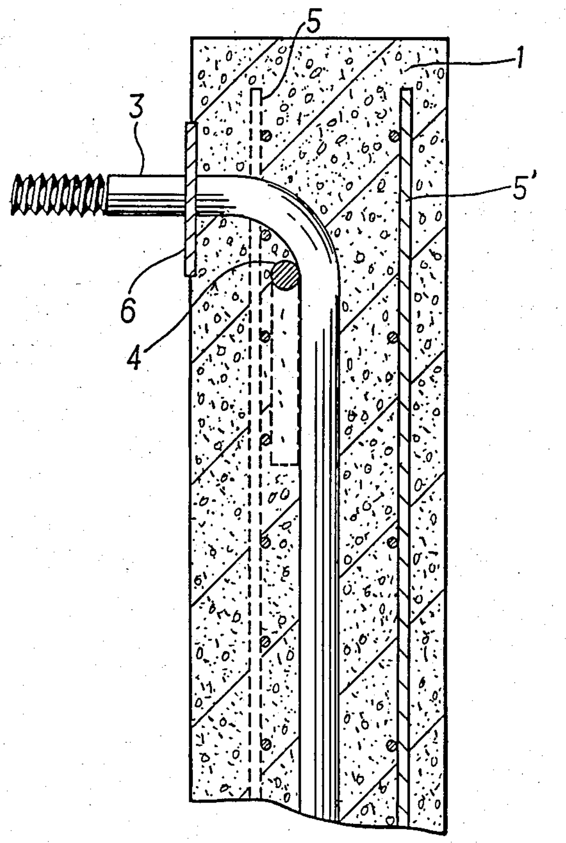
FIG. 2 is an enlarged cross-sectional view of the composite structure of FIG. 1, taken along the line II—II.

Referring to FIGS. 1 and 2, the illustrated precast composite structure according to the invention comprises a matrix of cured carbon fiber reinforced concrete 1 containing carbon fiber in an amount of from 0.2 to 10% by volume, preferably from 1 to 5% by volume, reinforcing steel bars 2, 2′ entirely buried in the matrix 1, an anchor bolt 3 partly buried in the matrix 1, an L-shaped reinforcing steel bar 4 entirely buried in the matrix 1, reinforcing steel meshes 5, 5′ entirely buried in the matrix 1, and a square steel plate 6 one side of which is buried in the matrix 1 and through the center of which the anchor bolt 3 penetrates perpendicularly. Insulating layers (not shown) having an electric resistance of at least about 100 ohms have been formed in accordance with the invention on the entire surfaces of the reinforcing steel bars 2, 2′, L-shaped bar 4 and reinforcing meshes 5, 5′, as well as on those surfaces of the anchor bolt 3 and plate 6 which will otherwise be brought in contact with the matrix 1.

Test results on which the invention is based will now be described.

CORROSION RESISTANCE AND POLARIZATION CURVE

A test specimen was inserted into a cement mortar contained in a wooden mold, and determined for the corrosion potential in the curing cement mortar, using a saturated calomel electrode as a reference electrode. The cement mortar used had a composition shown in Table 4 except that it contained no carbon fiber. The specimens tested were carbon fiber, a steel piece and a reinforcing stainless steel mesh, alone or in couple. The results are shown in Table 1.

TABLE 1

| | Corrosion resistance (in V vs SCE) | | | | |
|---|---|---|---|---|---|
| | Alone | | | Couple | |
| | CF | SS | St | SS + St | CF + St |
| No. 1 | −0.26 | −0.28 | −0.51 | −0.51 | −0.27 |
| No. 2 | −0.28 | −0.33 | −0.55 | −0.53 | −0.31 |
| No. 3 | −0.28 | −0.31 | −0.56 | −0.49 | — |

Note
SCE: Saturated calomel electrode
CF: carbon fiber
SS: stainless steel mesh (6 mm ∅)
St: steel piece
No. 1: measured 30 mins. after placement of mortar
No. 2: measured 1 hr. after placement of mortar
No. 3: measured after 3 hrs. curing in steam Table 1 reveals that the order of the corrosion potential in cement mortar is as follows.

$$CF > SS > (CF + St) >> (SS + St) > St$$

It can be understood therefore that when steel is in contact with carbon fiber there is a great possibility of occurrence of the galvanic corrosion. Thus, by the term "ferrous metal" we mean materials having a corrosion potential in a cement mortar substantially more basic than that of carbon fiber in the same cement mortar, including, for example, iron and some its alloys as well as such materials coated with Al or Zn.

A change with time of the corrosion potential of steel in a plain cement mortar containing no carbon fiber, measured in the manner as described above, is shown in FIG. 3. Similar measurements were carried out on the same steel maintained in a cement mortar of Table 4 containing 2.5% by volume of carbon fiber. The results are also graphically shown in FIG. 3.

As seen from FIG. 3, the corrosion potential of steel becomes more basic as time elapses. Namely, the steel changes from a so-called immobilized stateo to a so-called activated state. If we presume that the cathode reaction involved is a reduction of oxygen, the above-mentioned fact is believed to indicate that the oxygen in the cement mortar is slowly consumed and becomes lacking because of a slow replenishment thereof. It is understood therefore that steel which is in contact with noble carbon fiber in the curing mortar is in the activated state so that the galvanic corrosion thereof is promoted.

FIG. 4 graphically shows a behavior of the cathode polarization of steel in a cement mortar containing 2.5% by volume of carbon fiber and that of the same steel in the corresponding cement mortar containing no carbon fiber. It can be seen from FIG. 4 that the cathode current of steel in cement mortar increases drastically (about ten times of more) by addition of carbon fiber to the cement mortar. This is believed because the carbon fiber in the cement mortar has come in contact with the steel and the following redox reaction has proceeded on the carbon fiber.

$$O_2 + 2H_2O + 4e = 4OH^-$$

pH and redox potential of cement mix

Table 2 indicates the plain cement mix used in the above-mentioned tests (No. 2) and the corresponding cement mix containing 2.5% by volume of carbon fiber (No. 1) which was also used in the above-mentioned tests. Various cement mixes were prepared by varying the composition with respect to the kind of the aggregate, the kind of the dewatering agent, and use or non-use of the defoaming agent as indicated in Table 2, with the water to cement ratio and the sand to cement ratio unchanged. Each cement mix was tested for the pH and redox potential. The results are shown in Table 3.

TABLE 2

| | Concrete mix | | | | |
|---|---|---|---|---|---|
| | CF | Aggregate | Dewatering agent | Defoaming agent | Thickener |
| No. 1 | yes | Siliceous sand A | C | yes | yes |
| No. 2 | no | Siliceous sand A | C | yes | yes |
| No. 3 | yes | Siliceous sand B | C | yes | yes |
| No. 4 | yes | Siliceous sand A | D | yes | yes |
| No. 5 | yes | Siliceous sand A | C | no | yes |

TABLE 3

| | pH and redox potential | | |
|---|---|---|---|
| | | Redox potential (in V vs ACE) | |
| | pH | 30 mins, after placement | After 3 hrs. curing in steam |
| No. 1 | 13.4 | −0.22 | −0.48 |
| No. 2 | 13.5 | — | — |
| No. 3 | 13.7 | −0.17 | −0.30 |
| No. 4 | 13.4 | −0.13 | −0.20 |
| No. 5 | 13.4 | −0.15 | −0.20 |

As seen from Table 3, the pH of cement mix does not vary to a great extent by changing its formulation within the tested range, and is within a narrow range from 13.4 to 13.7. Table 3 further reveals that while the redox potential of cement mix is in the order of from −0.15 to −0.22 V, immediately after placement, it becomes slightly more basic in the course of curing in steam. This means that the oxidizing property of the environment decreases with time. Assuming that the redox potential of the environment is determined by oxygen in the environment, the maximum value of the redox potential will be determined by the oxygen redox electrode potential at equilibrium, which may be calculated as follows.

$$E_o = 1.23 - 0.06\text{ pH} + 0.015 \log P_{O_2} \text{ (in } V \text{ vs } SHE)$$

$$= 0.99 - 0.06\text{ pH} + 0.015 \log P_{O_2} \text{ (in } V \text{ vs } SCE)$$

wherein $Po_2$ represents a partial pressure of oxygen in the environment, that is 0.2 atm.; SHE means a saturated hydregen electrode; and SCE means a saturated calomel electrode. By introducing $Po_2=0.2$ atm. and pH=13.5 into the latter equation, we can calculated:

$$E_0=0.19 \text{ (in V vs SCE)}$$

This calculated value is considerably higher than the values of the redox potential, shown in Table 3, measured with a platinum electrode. It is believed, however, that allowing for the fact that the overvoltage of oxygen in reduction is very high, we may consider that the redox potential of the system can be determined by the reduction of oxygen so far as no other effective oxidant (e.g., $Fe^{3+}$) is present in the system.

From the test results it has been revealewd that the presence of carbon fiber in a cement matrix adversely corrodes steel in contact with the matrix. This is believed bacause the carbon fiber is very conductive and exhibits a noble potential well comparable to that of a noble metal auch as platinum, and in consequence, galvanic corrosion due to contact of steel with carbon fiber proceeds. It is further believed that the presence of carbon fiber in the cement matrix increases an effective cathode area of the corroding galvanic cell to form a so-called combination of a small anode with a large cathode thereby to promote the corrosion of steel in contact with the carbon fiber. This may be conceptionally shown in FIG. 5. Now referring to FIG. 5, at an initial stage the steel has a potential at a level as indicated by ①, and is still corrosion resistant. However, if a scale coating of the steel is locally destroyed for example by the presence of $Cl^-$ ion, the potential changes to a level as indicated by ②, and the steel begins to be corroded. Since the cathode reaction is promoted by the presence of the carbon fiber, the potential then changes to a level as indicated by ③ and the corrosion is accelerated. On the surface of the steel, which is an anode of the galvanic cell, the pH decreases as a result of the reaction:

$$Fe^{2+} + H_2O \rightarrow Fe(OH)^+ + H^+ \text{(decrease in pH)}$$

and thus the stable scale coating can be maintained no more, resulting in further promotion of the corrosion.

EXAMPLE 1

(1). A wooden mold suitable for obtaining a composite structure having dimensions of 40 mm×40 mm×160 mm was prepared. As a releasing agent mineral oil was applied to inner walls of the mold. A steel bar having a diameter of 10 mm was placed in the mold so that it may be buried in a rectangular structure to be obtained substantially along the center line thereof. It was a steel bar for reinforcing concrete in accordance with JIS G 3112 SD 30 having mill scale removed by shot blasting in advance. A carbon fiber containing concrete mix having a composition as indicated in Table 4 was poured into the mold and cured in steam at a temperature of 40° C. for a period of 5 hours. At the end of the period the molded structure was demolded, and then cured in an autoclave for 5 hours at a temperature of 180° C. and a pressure of 10 atmospheres. The structure so obtained comprised, as shown in FIG. 6, a matrix 11 of cured carbon fiber reinforced concrete and a reinforcing steel bar 12 buried in the matrix 12, and was of a shape and dimensions shown in the same figure. Several such structures were prepared.

(2). Similar structures were prepared by repeating the procedures of (1) above, except that the steel bar having a diameter of 10 mm was replaced with a bar prepared by hot dip zinc casting the same (the thickness of the zinc coating: 50 μm).

(3). Similar structures were prepared by repeating the procedures of (1) above, except that the steel bar having a diameter of 10 mm was replaced with a bar prepared by coating the same with an epoxy resin (the thickness of the coating: about 200 μm). The coating was applied as follows. The steel bar having mill scale removed by shot blasting was heated at a temperature of 240° C. for 15 minutes, exposed to a fluidized bed of a particulate epoxy resin for about 4 seconds to form a resin coating thereon and heated at a temperature of 200° C. for about 20 minutes to fully cure the resin.

(4). Similar structures were prepared by repeating the procedures of (1) above, except that the steel bar having a diameter of 10 mm was replaced with a bar prepared by coating the same with a cement mortar mix, followed by curing the mortar (the thickness of the coating: about 2 mm). The used cement mortar mix contained, per 1 cubic meter, 512 kg of water, 1082 kg of cement, 274 kg of siliceous sand powder and 10.8 kg of methyl cellulose. The siliceous sand powder comprised, by weight, 95.0% of $SiO_2$, 2.17% of $Al_2O_3$ and 1.17% of $Fe_2O_3$, and had a specific weight of 2.70 and a specific surface area of 3360 $cm^2/g$.

TABLE 4

| Formulation of CFRC | | |
|---|---|---|
| Carbon fiber | length (mm) | 6 |
| CF | content (vol. %) | 2.5 |
| Water to cement ratio W/C (%) | | 60 |
| Sand to cement ratio S/C (%) | | 60 |
| $kg/m^3$ | Water W | 489 |
| | Cement (high-early-strength cement) C | 814 |
| | Siliceous sand powder (size: 20 μm average and 100 μm maximum; specific weight: 2.68) S | 489 |
| | CF (carbon fiber) | 41.3 |
| | 90SH4000* | 3.0 |
| | PoNL4000** | 8.14 |
| | 14-HP*** | 3.27 |
| Flow value (mm) | | 169 |
| Flow value (plain, mm) | | 210 |

Note
*Thickener supplied by Shin-etsu Kagaku (methyl cellulose)
**Dewatering agent supplied by Rozoris Bussan
***Defoaming agent supplied by San-nobuko On various bars used above the state of corrosion was examined. After the curing in steam and after the curing in autoclave the bar was taked out of the composite structure, and observed for the state of corrosion by means of an optical microscope.

Further the composite structures cured in autoclave were subjected to an accelerated corrosion test two or four times. The test comprised heating the structure in an autoclave at 180° C. for 5 hours. According to our experience a single such autotoclave treatment substantially corresponds to a four years exposure to an ambient atmosphere. After two or four times of the autoclave treatment the bar was taked out of the structure and examined in the same manner as described above.

The results are shown in Table 5.

TABLE 5

| Tested reinforcing bar | After cured in | | Times of accelerate test | |
|---|---|---|---|---|
| | steam | autoclave | 2 | 4 |
| steel with no scale | A | B | D | E |
| hot dip zinc cast | A | A | B | C |
| coated with epoxy resin | A | A | A | A |
| coated with cement mortar | A | A | A | A |

Rating for the state of corrosion
A: No rust
B: Point rust, slightly
C: Point rust, several
D: Red rust in some areas
E: Red rust over more than 50% of the surface

EXAMPLE 2

The composite structures prepared by the procedures described in Example 1 were subjected to another accelerated corrosion test comprising 10 cycles of exposure to an atmosphere of 100% RH at 80° C. for 48 hours and exposure to an atmesphere of 40% RH at 80° C. for 24 hours. After the exposure the bar was taken out of the structure and examined for the state of corrosion by means of an optical microscope.

In the case of the structure prepared as in Example 1 (1), red rust had occurred over substantially all the surface of the bar (ordinary steel with no scale).

In the case of the structure prepared as in Example 1 (2), point rust of a size of about 0.1 to 0.3 mm was observed in 41 places of the surface of the bar (hot dip zinc cast).

In the case of the structures prepared as in Example 1 (3) and (4), no rust was observed on the surface of the bars (epoxy resin coated and cement mortar coated).

EXAMPLE 3

A composite structure was prepared as described in Example 1 (3), except that incisions of 0.5 $mm^2$, 1 $mm^2$, 2 $mm^2$ and 5 $mm^2$ were made on the surface of the cured epoxy resin coating, in two places, respectively (8 places in total). The structure was subjected to ten times the autoclave treatment described in Example 1. After the treatment the bar was taken out of the structure and examined for the state of corrosion by an optical microscope.

In one of the two places, where incisions of 2 $mm^2$ had been made, point rust of a size of about 0.2 mm diameter was observed. In one of the two places, where incisions of 5 $mm^2$ had been made, point rust of a size of about 0.4 mm diameter was observed. No rust was observed in other places.

We claim:

1. A process for manufacturing a precast composite structure of carbon fiber reinforced concrete comprising a matrix of cured carbon fiber reinforced concrete and at least one ferrous metallic member at least partly buried in said matrix, said process comprising the steps of:

forming an insulating layer having an electric resistance of at least about 100 ohms at least on that surface of said ferrous metallic member, which will otherwise be brought in contact with a concrete mix, placing said ferrous metallic member having the insulating layer formed thereon in position in a mold, pouring into said mold a concrete mix comprising a hydraulic cement, water, aggregate and 0.2 to 10% by volume of carbon fiber so that said ferrous metallic member may be at least partly buried in said concrete mix, partly curing the so molded composite structure in said mold until it becomes self-supporting, demolding the partly cured composite structure from said mold, and fully curing the demolded composite structure in an autoclave at a temperature between 100° C. and 215° C.

2. The process in accordance with claim 1, wherein a ferrous metallic mold is used and an insulating layer having an electric resistance of at least about 100 ohms is formed on that sureface of said mold, which will otherwise be brought in contact with the concrete mix, in advance of the pouring of the concrete mix.

3. The process in accordance with claim 1, wherein the insulating layer is formed from an epoxy resin.

4. The process in accordance with claim 1, wherein the insulating layer is formed from a cement mortar of paste.

5. A precast composite structure of carbon fiber reinforced concrete comprising a matrix of cured carbon fiber reinforced concrete containing 0.2 to 10% by volume of carbon fiber, at least one ferrous metallic member at least partly buried in said matrix and an insulating layer on the surface of said ferrous metallic member for preventing contact of said ferrous metallic member with the carbon fiber, said insulating layer having an electric resistance of at least about 100 ohms.

6. The structure in accordance with claim 5, wherein said insulating layer comprises a cured epoxy resin.

7. The structure in accordance with claim 5, wherein said insulating layer comprises a cured cement mortar or paste.

* * * * *